US010564873B2

United States Patent
Durand

(10) Patent No.: US 10,564,873 B2
(45) Date of Patent: Feb. 18, 2020

(54) METHOD FOR UPDATING A FIRMWARE ON A LOW MEMORY DEVICE

(71) Applicant: GEMALTO SA, Meudon (FR)

(72) Inventor: Stephane Durand, Meudon (FR)

(73) Assignee: Thales Dis France SA, Meudon (FR)

( * ) Notice: Subject to any disclaimer, the term of this patent is extended or adjusted under 35 U.S.C. 154(b) by 5 days.

(21) Appl. No.: 15/108,308

(22) PCT Filed: Nov. 26, 2014

(86) PCT No.: PCT/EP2014/075653
§ 371 (c)(1),
(2) Date: Jun. 26, 2016

(87) PCT Pub. No.: WO2015/096947
PCT Pub. Date: Jul. 2, 2015

(65) Prior Publication Data
US 2016/0321003 A1    Nov. 3, 2016

(30) Foreign Application Priority Data
Dec. 26, 2013  (EP) .................................... 13306865

(51) Int. Cl.
*G06F 8/656* (2018.01)
*G06F 3/06* (2006.01)
*G06F 9/445* (2018.01)

(52) U.S. Cl.
CPC .......... *G06F 3/0632* (2013.01); *G06F 3/0604* (2013.01); *G06F 3/0652* (2013.01);
(Continued)

(58) Field of Classification Search
CPC .................................................. G06F 3/0632
(Continued)

(56) References Cited

U.S. PATENT DOCUMENTS

| 5,787,288 A | 7/1998 | Katsumi et al. |
| 6,047,128 A * | 4/2000 | Zander ...................... G06F 8/65 717/173 |

(Continued)

FOREIGN PATENT DOCUMENTS

| CN | 101101554 A | 1/2008 |
| CN | 101650662 A | 2/2010 |
| WO | WO03025742 A2 | 3/2003 |

OTHER PUBLICATIONS

PCT/EP2014/075653, International Search Report, dated Feb. 18, 2015, European Patent Office, P.B. 5818 Patentlaan 2 NL-2280 HV Rijswijk.

(Continued)

*Primary Examiner* — Kim Huynh
*Assistant Examiner* — Sumil M Desai
(74) *Attorney, Agent, or Firm* — The Jansson Firm; Pehr B. Jansson

(57) ABSTRACT

The present invention relates to a method for updating a firmware on a device, from a current version to a new version, said firmware being split into: —a core part, —an extended part comprising a plurality of entry points callable by the core part, said method comprising: —inhibiting the entry points between the core part of the current version, called current core part, and the extended part of the current version, called current extended part; —erasing the current extended part; —downloading the core part of the new version, called new core part; —erasing the current core part; —downloading—the extended part of the new version, called new extended part; —activating the entry points between the new core part and the new extended part.

19 Claims, 7 Drawing Sheets

(52) U.S. Cl.
CPC ............ *G06F 3/0673* (2013.01); *G06F 8/656* (2018.02); *G06F 9/445* (2013.01)

(58) Field of Classification Search
USPC .......................................................... 713/2
See application file for complete search history.

(56) References Cited

U.S. PATENT DOCUMENTS

| | | | |
|---|---|---|---|
| 7,979,855 B2* | 7/2011 | Inui ........................... | G06F 8/65 709/221 |
| 2005/0055595 A1* | 3/2005 | Frazer ..................... | G06F 8/665 713/400 |
| 2008/0120590 A1* | 5/2008 | Wang ....................... | G06F 9/466 717/100 |
| 2013/0125107 A1* | 5/2013 | Bandakka ................ | G06F 8/665 717/171 |

OTHER PUBLICATIONS

PCT/EP2014/075653, Written Opinion of the International Searching Authority, Feb. 18, 2015, European Patent Office, D-80298 Munich.

* cited by examiner

METHOD FOR UPDATING A FIRMWARE ON A LOW MEMORY DEVICE

FIELD OF THE INVENTION

The invention relates to the field of low memory devices, for example Smartphones. The invention provides a method for updating a firmware set up on a low memory device, that is to say downloading a new available version of the firmware in place of a current stored version of said firmware.

BACKGROUND

In this document, "low memory device" refers to a device comprising not memory enough for storing both the current and the new versions of the firmware. As a consequence, the firmware cannot fully update itself because it will be erased during the update process.

Three methods are currently known for updating a firmware of such a low memory device. According to a first method, the low memory device is connected to another device, for example a computer. Then, the other device downloads the new version of the firmware and copies the new version in place of the current version in the device memory. However, this method requires the use of an external device.

According to a second method, an external memory is added to the device, for example a SD card. Then, the device connects to a server via a wireless connection so as to download the new version of the firmware and replaces versions. However, this method requires the use of an external memory. Moreover, the device has to be adapted for receiving such an external memory.

A third method requires a special feature rich boot loader able to erase the current version of the firmware, establish a remote connection to an update server, and download the new version in place of the current version. However, such a boot loader is complex because a communication stack has to be embedded in said boot loader. As a consequence, risks for bugs and needs for updates are high. Moreover, said boot loader requires a lot of internal memory.

SUMMARY

The invention aims at providing a method for updating a firmware on a low memory device, which does not require wired connection to another device, an external memory, or a boot loader embedding communication stack.

To this end, the invention provides a method for updating a firmware on a device, from a current version to a new version, said firmware being split into:
 a core part,
 an extended part comprising a plurality of entry points callable by the core part,
 said method comprising:
 inhibiting the entry points between the core part of the current version, called current core part, and the extended part of the current version, called current extended part;
 erasing the current extended part;
 downloading the core part of the new version, called new core part;
 erasing the current core part;
 downloading the extended part of the new version, called new extended part;
 activating the entry points between the new core part and the new extended part.

The method applies to a specific kind of firmware. A firmware according to the invention is split into a core part and an extended part comprising a plurality of entry points callable by the core part. Entry points are for example functions, programs, softwares, sub-softwares, etc. Thus, a firmware according to the invention is functionally and physically split into two portions. The core part has no functional dependence on the extended part. In other words, the core part is able to work independently from the extended part, if the entry points between the current core part and the current extended part are inhibited.

In a not limited embodiment, the core part comprises means for accessing a list of these entry points, and means for inhibiting the entry points of this list.

The core part of a firmware according to the invention comprises means for connecting to a remote server, and means for downloading data from this remote server. The core part of a firmware according to the invention also comprises means for programming data into the memory of the device, that is to say at least selecting a memory place where downloading data from the server, and erasing data from the memory.

When bindings between the core part and the extended part are severed or inhibited, the core part is still able to fulfill at least the above mentioned minimal function, that is to say connecting to a server, downloading data, and programming data into the memory.

The boot loader of the low memory device has no need to be able to connect to a remote server, because the two download steps are realized by the current core part and the new core part. Thus, there is no need to embed communication stack in the boot loader, unlike the boot loader used in the third method here above detailed. Moreover, no connection to an external device, and no external memory are required.

According to not limited embodiments, the method can comprise one or more of the following additional characteristics.

In a preferred embodiment:
 the steps of inhibiting the entry points, erasing the current extended part and downloading the core part are realized by the current core part;
 the step of erasing the current core part is realized by a boot loader of the device;
 the steps of downloading the extended part and activating the entry points are realized by the new core part.

In a not limited embodiment, the method comprises steps, between the step of downloading the new core part and the step of erasing the current core part of:
 rebooting the device, by the current core part;
 detecting an update is pending, by the boot loader.

Thus, the boot loader does not load the current core part, as it normally does, that is to say when the method for updating is not in process.

In a not limited embodiment:
 the current core part is initially stored in a first memory space of the memory,
 the current extended part is initially stored in a second memory space of the memory, distinct from the first memory space,
 the new core part is downloaded on a third memory space of the memory such as:
  the third memory space is distinct from the first memory space, and the third memory space and the second memory space overlap at least in part.

Thus, memory space in the memory of the device is optimized.

In a preferred embodiment, the method comprises the following steps, between the step of erasing the current extended part and the step of downloading the new core part, of:

evaluating the size of the new core part, comparing said size with the current core part size, determining the third memory space emplacement in the memory such as: if said size is larger than the current core part size, then sparing free memory space between the first memory space and the third memory space, such as the total size of the first memory space and the free memory space is at least equal to the size of the new core part.

Indeed, the new core part is intended to replace the current core part in the memory during the step of copying the new core part from the third memory space on the fourth memory space. However, the new core part is possibly larger than the current core part. Thanks to these additional steps, enough memory space for storing the new core part is ensured.

Advantageously, the method comprises a step of copying the new core part from the third memory space on a fourth memory space of the memory such as:

the fourth memory space is distinct from the third memory space, the fourth memory space and the first memory space overlap at least in part.

Thus, memory space in the memory of the device is optimized.

Advantageously, the new extended part is downloaded on a fifth memory space of the memory such as:

the fifth memory space is distinct from the fourth memory space, the fifth memory space and the second memory space overlap at least in part.

Thus, memory space in the memory of the device is optimized.

Advantageously, the step of downloading the new core part by the current core part comprises a sub-step of setting a first marker indicating progression of said download.

Advantageously, the step of downloading the new extended part by the new core part comprises setting a second marker indicating progression of said download.

In a not limited embodiment, the first and/or the second marker can take two values: a first value indicates that the download has not been realized, or has not been fully realized; a second value indicates that the download has been fully realized. In another not limited embodiment, the first marker and/or the second marker indicate the percentage of data downloaded.

The first and/or the second marker are useful in case of a problem during the execution of the method for updating, for example the device turns off because its battery is empty, or there is a loss of connection with the update server. Indeed, accessing the information that a download has been fully accomplished, or the information that a download has been realized in part avoids realizing the download again. This allows saving network resources.

In a not limited embodiment, the method comprises a step, realized by the current core part, prior to the step of inhibiting the entry points, of terminating internal activities not related to the update method.

In a not limited embodiment, the method comprises a step, between the steps of inhibiting the entry points and the step of erasing the second memory space, of rebooting the device. This step is useful in the case the firmware does not provide the necessary mechanisms to terminate internal activities not related to the update method.

In a not limited embodiment, the step of inhibiting the entry points comprises: each time an entry point is called by the current core part, calling a void function. This is an easy way to inhibit the entry points.

In a not limited embodiment, the method after the step of downloading the new core part, of propagating connection parameters to the new core part, so as to enable the new core part to connect to an update server.

In a not limited embodiment, the method comprises a step, after the step of activating the entry points, of checking the activation of these entry points. Thus, if at least one entry point is still active, the step of activating the entry points is processed again.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF A NOT LIMITED EMBODIMENT

In the following description, well-known functions or constructions by the man skilled in the art are not described in detail since they would obscure the invention in unnecessary detail.

Figure 1:
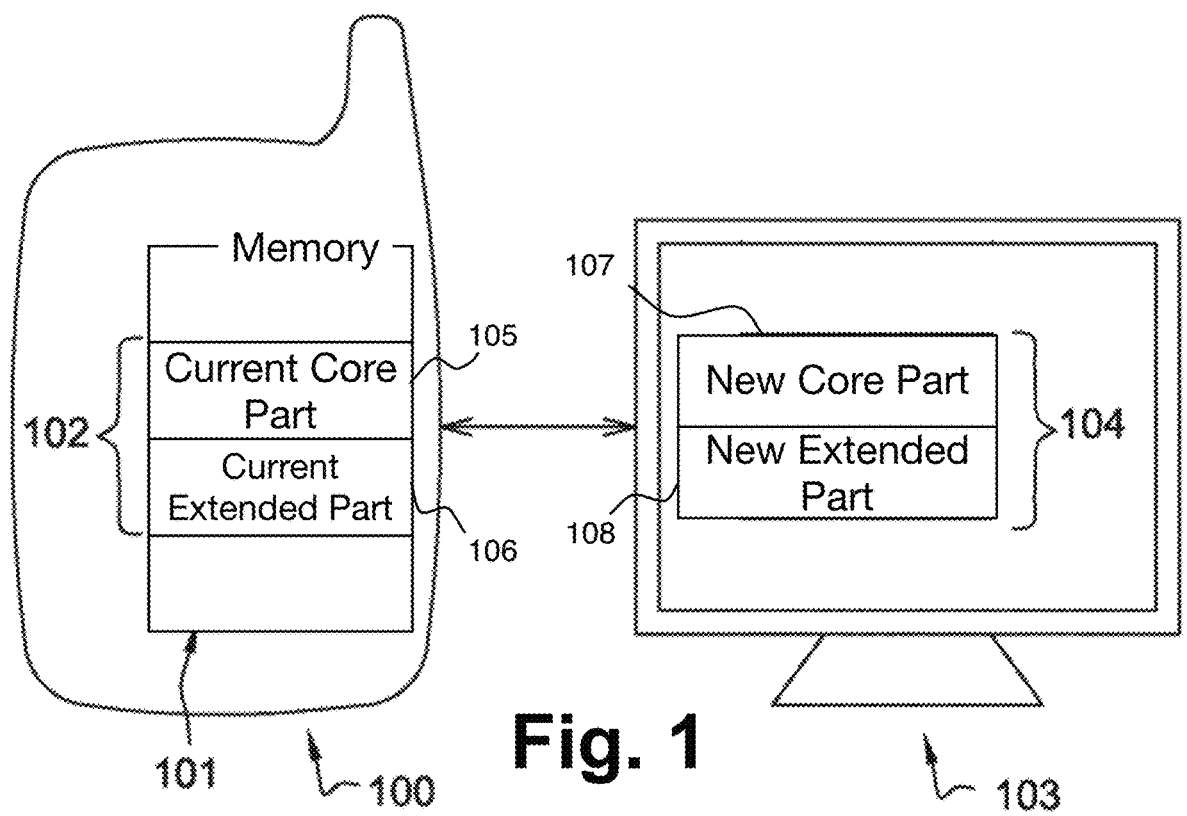
FIG. 1 shows a device and an update server.

FIG. 1 shows a low memory device 100 comprising a memory 101 on which a current version 102 of a firmware is stored and set up.

The device 100 is able to establish a wireless connection with an update server 103 comprising a new version 104 of the firmware. A method 200 according to the invention aims at replacing the current version 102 by the new version 104 on the memory 101.

The firmware is functionally and physically split into two parts named core part and extended part. Thus:

the current version 102 of the firmware comprises a current core part 105 and a current extended part 106;

the new version 104 of the firmware comprises a new core part 107 and a new extended part 108.

In this embodiment, the core parts 105, 107 are as small as possible and the extended parts 106, 108 are bigger than the core parts 105, 107.

When they are set up on a device, the core parts 105, 107 are able to work on their own to fulfil minimal functions:
  connect to a server
  download data
  program data into the memory
  bind external functionalities to themselves.

When they are set up on a device, the extended parts 106, 108 are able to activate additional features and specific business logic of the device. The extended parts 106, 108 are able to call various services provided by the core parts 105, 107. The extended parts 106, 108 are not independent from the core parts 105, 107. Indeed, the extended parts 105, 107 comprise a plurality of entry points callable by the core parts 106, 108. Entry points are for example functions, programs, softwares, sub-softwares, etc.

On the contrary, if the entry points are inhibited, the core parts 105, 107 have no functional dependences on the extended parts 106, 108.

Figure 2:
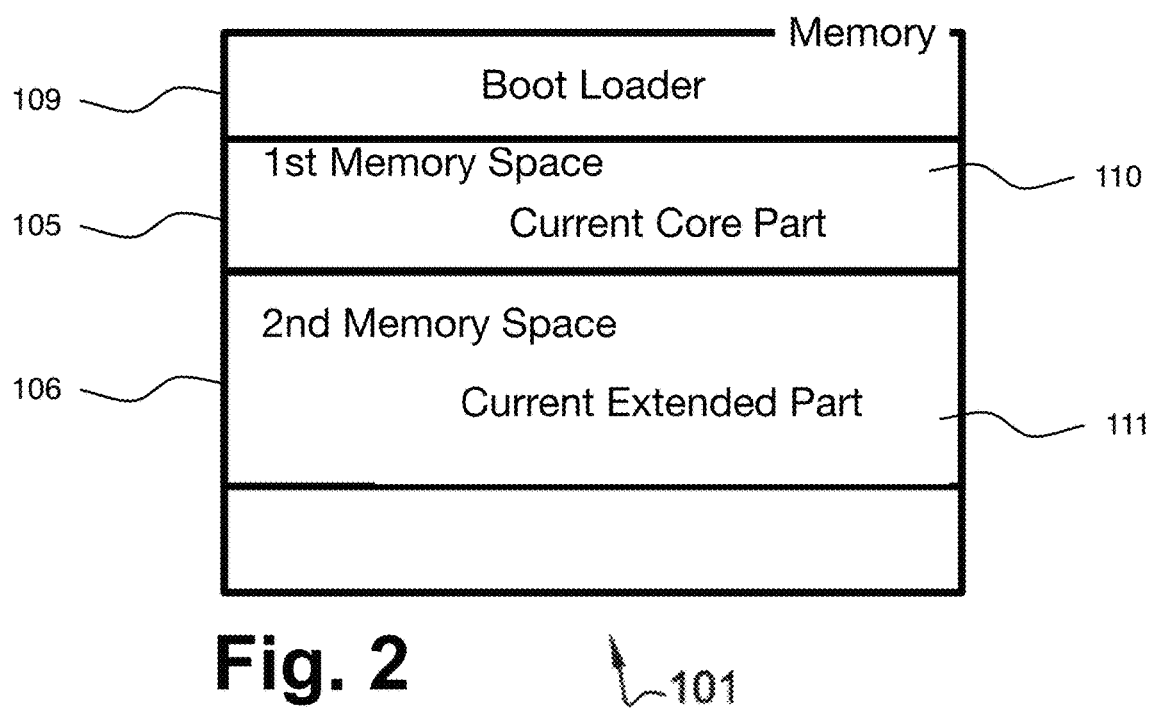
FIG. 2 shows the memory of the device of FIG. 1, on which is stored a firmware according a not limited embodiment of the invention, said firmware comprising a current core part and a current extended part.

FIG. 2 shows the memory 101 in more details. The memory 101 comprises a boot loader 109 adapted for loading the firmware set up on the memory 101, that is to say:
  initially the current version 102
  after the execution of the method, the new version 104.

The memory 101 also comprises:
  a first memory space 110 on which is stored the current core part 105
  a second memory space 111 on which is stored the current extended part 106.

It should be noted that this storage is an example, but in other embodiments the firmware could be stored differently, for example in several memories of the device.

The entry points between the current core part 105 and the current extended part 106 are initially functional. The rest of the memory is free space.

Figure 3A:
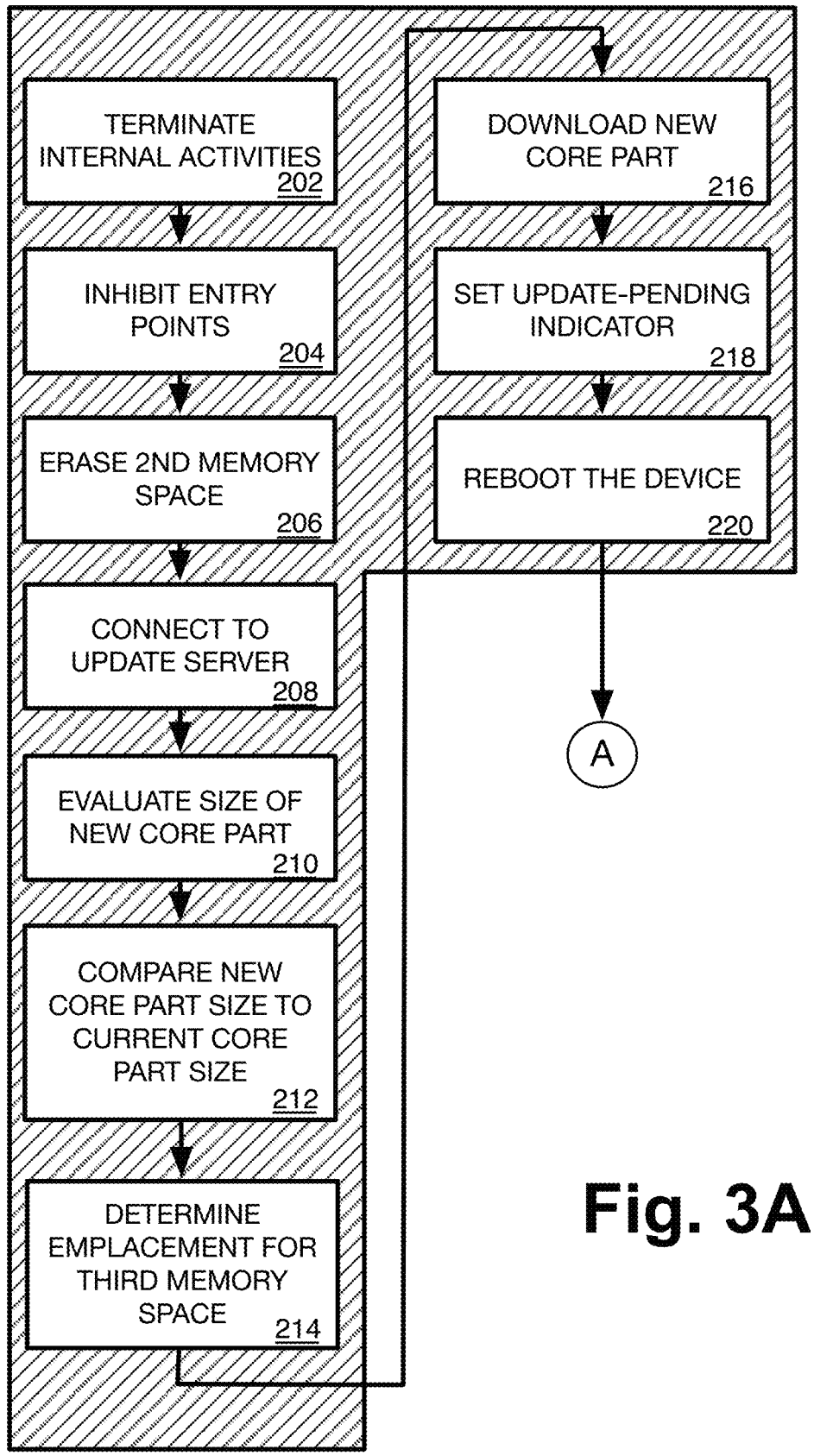
FIG. 3, which consists of FIGS. 3A, 3B, and 3C, shows steps of a method for updating the firmware of FIG. 1.
Figure 3B:
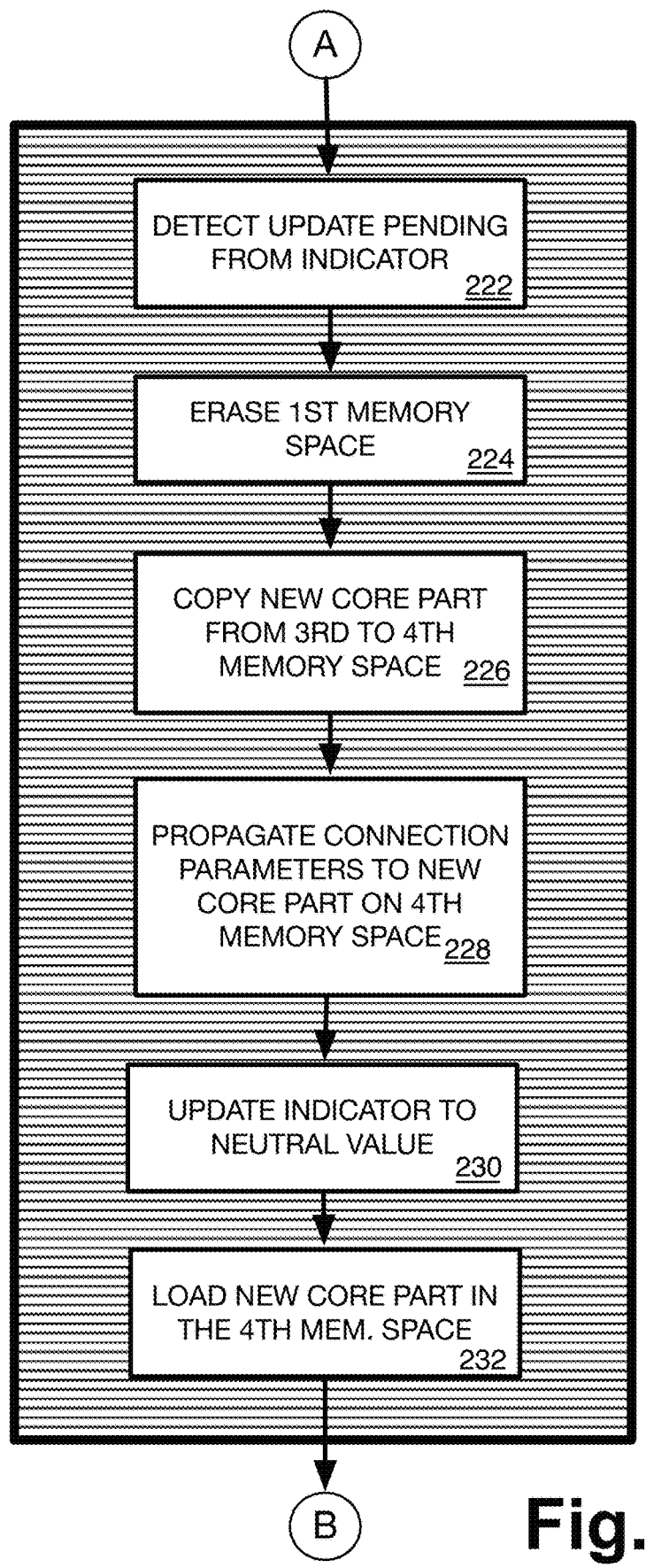
Figure 3C:
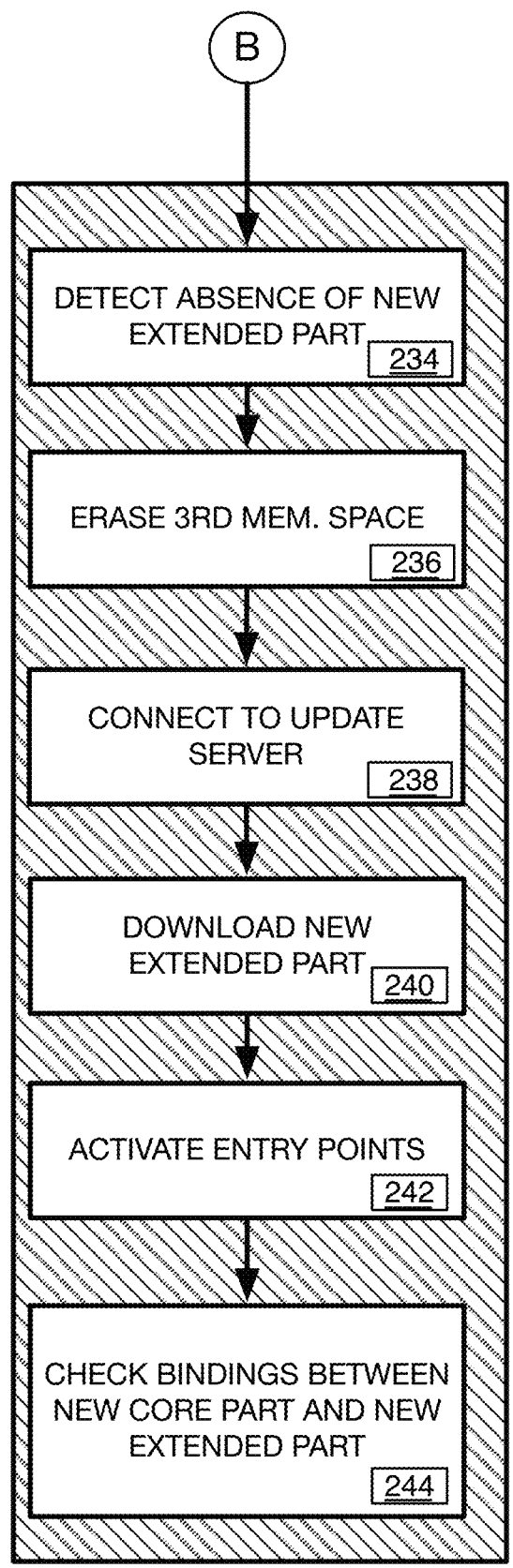
Figure 4:
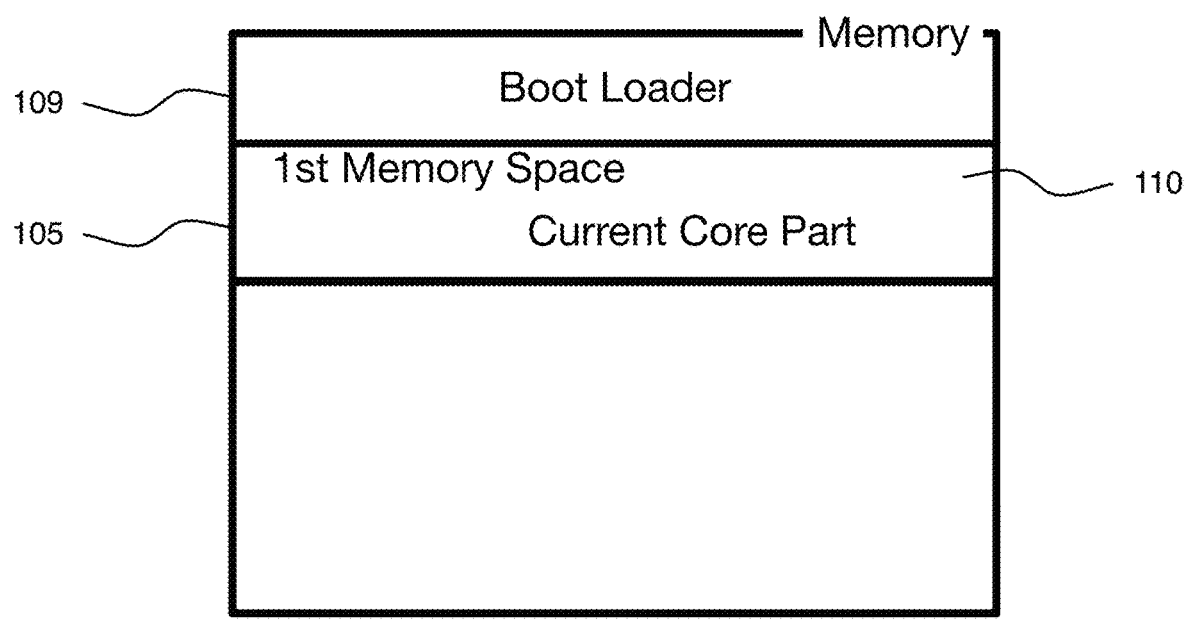
FIG. 4 shows a step of erasing the current core part, according to the method of FIG. 2.
Figure 5:
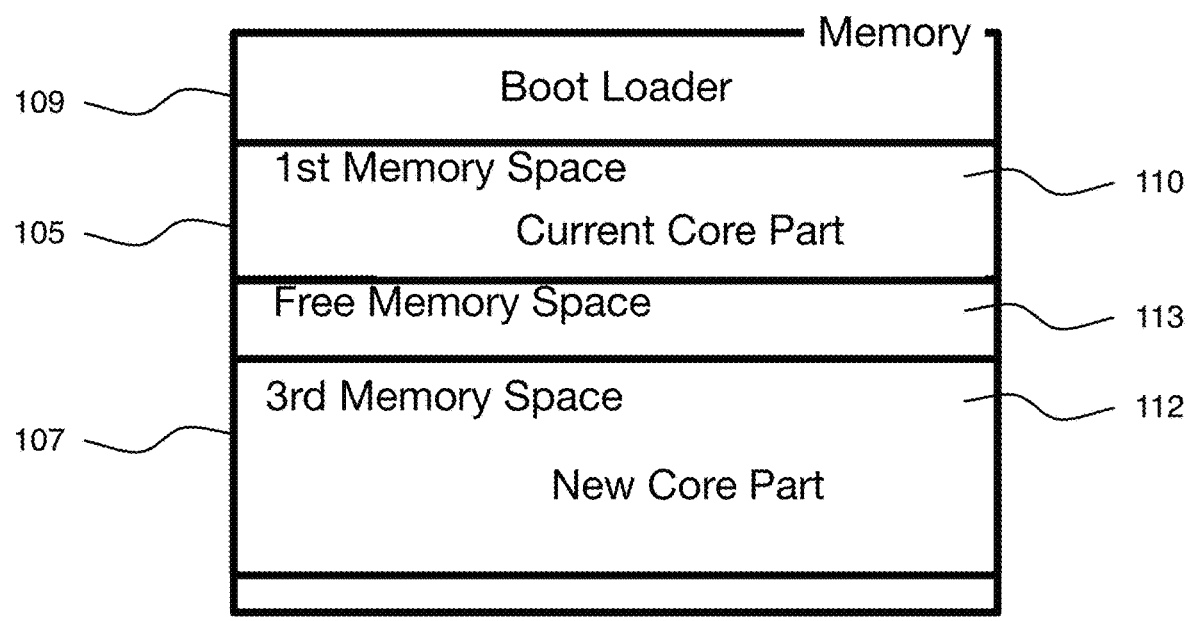
FIG. 5 shows a step of downloading a new core part of a new version of the firmware, according to the method of FIG. 2.

FIG. 3 shows steps of the method 200 for updating the firmware, according to a not limited embodiment:
  the following steps are realized by the current core part 105:
    step 202: terminating internal activities not related to the update method 200, for example business logic. In case the firmware does not provide the necessary mechanisms to realize this step 202, then the following step 204 is realized, followed by a step of reboot of the device 101.
    step 204: inhibiting the entry points between the current core part 105 and the current extended part 106, that is to say cutting off the bindings between the current core part 105 and the current extended part 106. This step 204 can be realized by inserting a code at the beginning of each entry point, such as each time an entry point is called by the current core part 105, a void function is called. This cut is of persistent nature. In an embodiment, the inhibition is checked, and if at least an entry point is active (for example of a power loss during step 204), then step 204 is realized again.
    step 206: erasing the second memory space 111 comprising the current extended part 106, so as to release memory space in the memory 101. The state of the memory 101 at the end of this step 206 is shown at FIG. 4.
    step 208: connecting to the update server 103 comprising the new version 104 of the firmware.
    step 210: evaluating the size of the new core part 105.
    step 212: comparing said size with the current core part size 105.
    step 214: determining a third memory space 112 emplacement in the memory 101 for downloading the new core part 107, such as:
      the third memory space 112 is distinct from the first memory space 110, so as the current core part 105 is not erased by the new core part 107;
      the third memory space 112 and the second memory space 111 overlap at least in part, so as to reuse the second memory space 111;
      if the size of the new core part 105 is larger than the current core part 105 size, then free memory space 113 is spared between the first memory space 110 and the third memory space 112, such as the total size of the first memory space 110 and the free memory space 113 is at least equal to the size of the new core part 107.
    step 216: downloading the new core part 107 from the update server 103, on the third memory space 112 of the memory 101. This step 216 comprises a sub-step of setting a first marker indicating progression of said download, useful in case of a problem during the download step 216 or during the execution of the method 200, for example in case of power loss of the device 100. This aims at avoiding downloading again the new core part 105. In case of power loss, this first marker is evaluated; if download is not complete, step 216 is realized again. The state of the memory 101 at the end of this step 216 is shown at FIG. 5.
    step 218: after the download is complete and validated, updating an indicator to a value indicating the update method 200 is pending, that will be used by the boot loader 109 in a following step 222.
    step 220: rebooting the device.
  the following steps are realized by the boot loader 109 of the device 100, launched at the device 100 reboot:
    step 222: detecting an update is pending by evaluating the indicator updated at step 218, so as to avoid loading the current core part 105.
    step 224: erasing the first memory space 110 comprising the current core part 105, so as to release memory space to store the new core part 107.
    step 226: copying the new core part 105 from the third memory space 112 on a fourth memory space 114 of the memory 101 such as:
      the fourth memory space 114 is distinct from the third memory space 112, so as to avoid erasing the new core part 107 stored on the third memory space 112 during the copy;
      the fourth memory space 114 and the first memory space 110 overlap at least in part, so as to reuse the first memory space 110;
      if the size of the new core part 107 is larger than the size of the current core part 105, then the fourth memory space 114 comprises the first memory space 110 and the free memory space 113;
      if the size of the new core part 107 is smaller than the size of the current core part 105, then the first memory space 110 comprises the fourth memory space 114.

Figure 6:
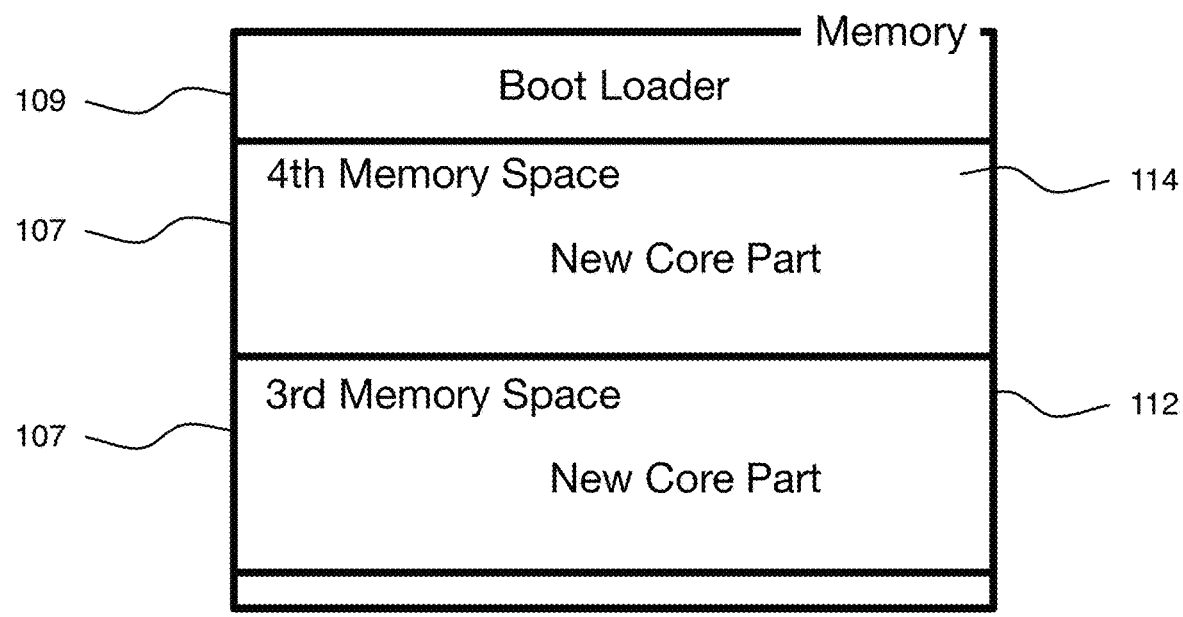
FIG. 6 shows a step of copying the new core part in place of the previous core part, according to the method of FIG. 2.

The state of the memory 101 at the end of this step 226 is shown at FIG. 6.
    step 228: propagating connection parameters to the new core part 107 on the fourth memory space 114, so as to enable the new core part 107 to connect to the update server 103.

step 230: updating the indicator evaluated at step 222 to a neutral value, so as to avoid reiterating steps 224 to 228 at the next reboot of the device 100.

step 232: loading, that is to say executing, the new core part 107 stored in the fourth memory space 114.

the following steps are realized by the new core part 107 in the fourth memory space 114:

step 234: detecting the new extended part 108 absence.

step 236 erasing the third memory space 112 comprising the new core part 107, so as to release memory space for downloading the new extended part 108.

step 238: connecting to the update server 103.

step 240: downloading the new extended part 108 from the update server 103 on a fifth memory space 115 of the memory 101 such as:

the fifth memory space 115 is distinct from the fourth memory space 114, so as to avoid erasing the new core part 107 during the download;

the fifth memory space 115 and the second memory space 111 overlap at least in part, so as to reuse the second memory space 111;

and this step 240 comprises a sub-step of setting a second marker indicating progression of said download useful in case of a problem during the download or during the execution of the method, for example in case of power loss of the device 100. This aims at avoiding downloading again the new extended part 105. In case of power loss, this second marker is evaluated. If download is not complete, step 216 is realized again.

Figure 7:
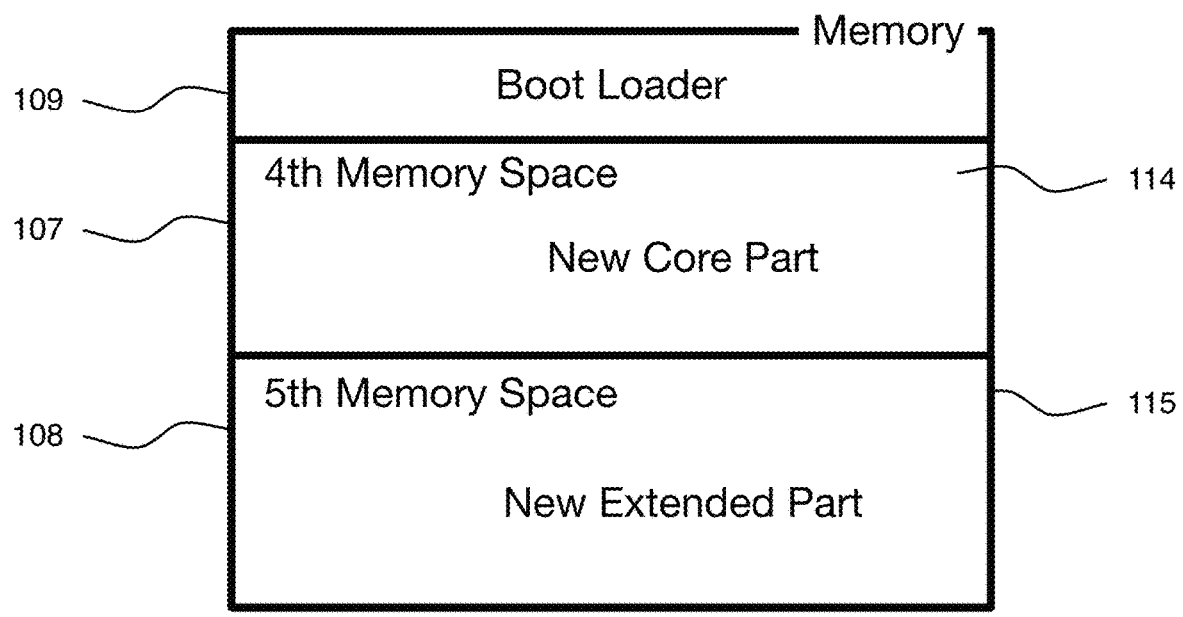
FIG. 7 shows a step of downloading a new extended part of a new version of the firmware in place of the current extended part, according to the method of FIG. 2.

The state of the memory 101 at the end of this step 240 is shown at FIG. 7.

step 242: activating the entry points between the new core part 107 and the new extended part 108.

step 244: checking bindings between the new core part 107 and the new extended part 108. If at least one entry point is inhibited (for example because of power loss during step 242), then step 242 is realized again.

Obviously, this method requires that the sum of the size of the new core part 107 and the new extended part 108 is lower than the size of the memory 101.

The invention claimed is:

1. A method for updating a firmware on a device, said device comprising a memory configured to store at least a version of a firmware, the firmware being updated when applying the method from a current version to a new version, said firmware including:

a core part comprising means for connecting to a remote server and means for downloading data from this remote server, an extended part comprising a plurality of entry points callable by the core part, the core part being able to work independently from the extended part if the entry points are inhibited, and a list of the entry points callable by the core part, the list being accessible by the core part and providing a binding between the core part and the entry points of the extended part;

said method comprising:

inhibiting the entry points between the core part of the current version, called current core part, and the extended part of the current version, called current extended part, the inhibition being performed by cutting off at least the binding between the current core part and the current extended part by inserting a code at the beginning of each entry point, such that each time an entry point is called by the current core part, a void function is called, so that the current core part has no functional dependencies on the extended part, this step being realized by the current core part;

erasing the current extended part, this step being realized by the current core part;

downloading in the memory the core part of the new version, called new core part, this step being realized by the current core part;

erasing the current core part, this step being realized by a boot loader of the device;

downloading in the memory the extended part of the new version, called new extended part, this step being realized by the new core part;

activating the entry points between the new core part and the new extended part, this step being realized by the new core part.

2. The method according to claim 1, comprising, between the step of downloading the new core part and the step of erasing the current core part, the steps of:

rebooting the device, by the current core part;

detecting an update is pending, by the boot loader.

3. The method according to claim 2, wherein:

the current core part is initially stored in a first memory space of the memory, the current extended part is initially stored in a second memory space of the memory, distinct from the first memory space, the new core part is downloaded on a third memory space of the memory such as:

the third memory space is distinct from the first memory space, and the third memory space and the second memory space overlap at least in part.

4. The method according to claim 3, comprising a step of copying the new core part from the third memory space on a fourth memory space of the memory such as:

the fourth memory space is distinct from the third memory space, the fourth memory space and the first memory space overlap at least in part.

5. The method according to claim 2, wherein the step of downloading the new core part comprises setting a first marker indicating progression of said download.

6. The method according to claim 2, wherein the step of downloading the new extended part comprises setting a second marker indicating progression of said download.

7. The method according to claim 2, comprising, prior to the step of inhibiting the entry points, a step of terminating internal activities not related to the update method.

8. The method according to claim 2, comprising, between the steps of inhibiting the entry points and the step of erasing the second memory space, a step of rebooting the device.

9. The method according to claim 1, wherein:

the current core part is initially stored in a first memory space of the memory, the current extended part is initially stored in a second memory space of the memory, distinct from the first memory space, the new core part is downloaded on a third memory space of the memory such as:

the third memory space is distinct from the first memory space, and the third memory space and the second memory space overlap at least in part.

10. The method according to claim 9, comprising, between the step of erasing the current extended part and the step of downloading the new core part, the steps of:
- evaluating the size of the new core part, comparing said size with the current core part size,
- determining the third memory space emplacement in the memory such as: if said size is larger than the current core part size, then sparing free memory space between the first memory space and the third memory space, such as the total size of the first memory space and the free memory space is at least equal to the size of the new core part.

11. The method according to claim 10, comprising a step of copying the new core part from the third memory space on a fourth memory space of the memory such as:
- the fourth memory space is distinct from the third memory space,
- the fourth memory space and the first memory space overlap at least in part.

12. The method according to claim 9, comprising a step of copying the new core part from the third memory space on a fourth memory space of the memory such as:
- the fourth memory space is distinct from the third memory space,
- the fourth memory space and the first memory space overlap at least in part.

13. The method according to claim 12, wherein the new extended part is downloaded on a fifth memory space of the memory such as:
- the fifth memory space is distinct from the fourth memory space,
- the fifth memory space and the second memory space overlap at least in part.

14. The method according to claim 1, wherein the step of downloading the new core part comprises setting a first marker indicating progression of said download.

15. The method according to claim 1, wherein the step of downloading the new extended part comprises setting a second marker indicating progression of said download.

16. The method according to claim 1, comprising, prior to the step of inhibiting the entry points, a step of terminating internal activities not related to the update method.

17. The method according to claim 1, comprising, between the steps of inhibiting the entry points and the step of erasing the current extended part, a step of rebooting the device.

18. The method according to claim 1, comprising, after the step of downloading the new core part, a step of propagating connection parameters to the new core part.

19. The method according to claim 1, comprising, after the step of activating the entry points, a step of checking the activation of these entry points.

* * * * *